United States Patent [19]
Puech

[11] Patent Number: 5,108,047
[45] Date of Patent: Apr. 28, 1992

[54] DEPLOYABLE DEVICE, IN PARTICULAR INTENDED FOR THE DECELERATION OF PLANETARY REENTRY BODIES

[75] Inventor: Jean-François Puech, Mareil-sur-Mauldre, France

[73] Assignee: Dassault Aviation, Paris, France

[21] Appl. No.: 679,929

[22] Filed: Apr. 3, 1991

[30] Foreign Application Priority Data

Apr. 19, 1990 [FR] France .................. 90 04998

[51] Int. Cl.⁵ .................................. B64C 9/32
[52] U.S. Cl. ........................... 244/113; 244/160; 244/138 R
[58] Field of Search ............ 244/158 R, 158 A, 160, 244/162, 113, 138 R

[56] References Cited

U.S. PATENT DOCUMENTS

| | | | |
|---|---|---|---|
| 3,047,259 | 7/1962 | Tatnall | 244/160 |
| 3,228,634 | 1/1966 | Chakoian | 244/160 |
| 3,604,667 | 9/1971 | Moraes | 244/160 |
| 3,695,177 | 10/1972 | Chakoian | 244/138 R |
| 4,040,580 | 8/1977 | Schwaerzler | 244/113 |
| 4,896,847 | 1/1990 | Gertsch | 244/158 R |

FOREIGN PATENT DOCUMENTS 0979498  4/1951  France .................. 244/113

Primary Examiner—Joseph F. Peters, Jr.
Assistant Examiner—Christopher P. Ellis
Attorney, Agent, or Firm—Stevens, Davis, Miller & Mosher

[57] ABSTRACT

Deployable device composed of rigid panels connected by articulations to a support (2). First panels (4), or arms, pivoting more than second panels (6), or main panels, in order to move from the folded-up position to the deployed position, are preferably smaller than the said second panels. Triangular linking panels (7) are placed between the first and second panels and articulated on them. The actuating means preferably lock the device both in the deployed position and in the folded-up position.

10 Claims, 5 Drawing Sheets

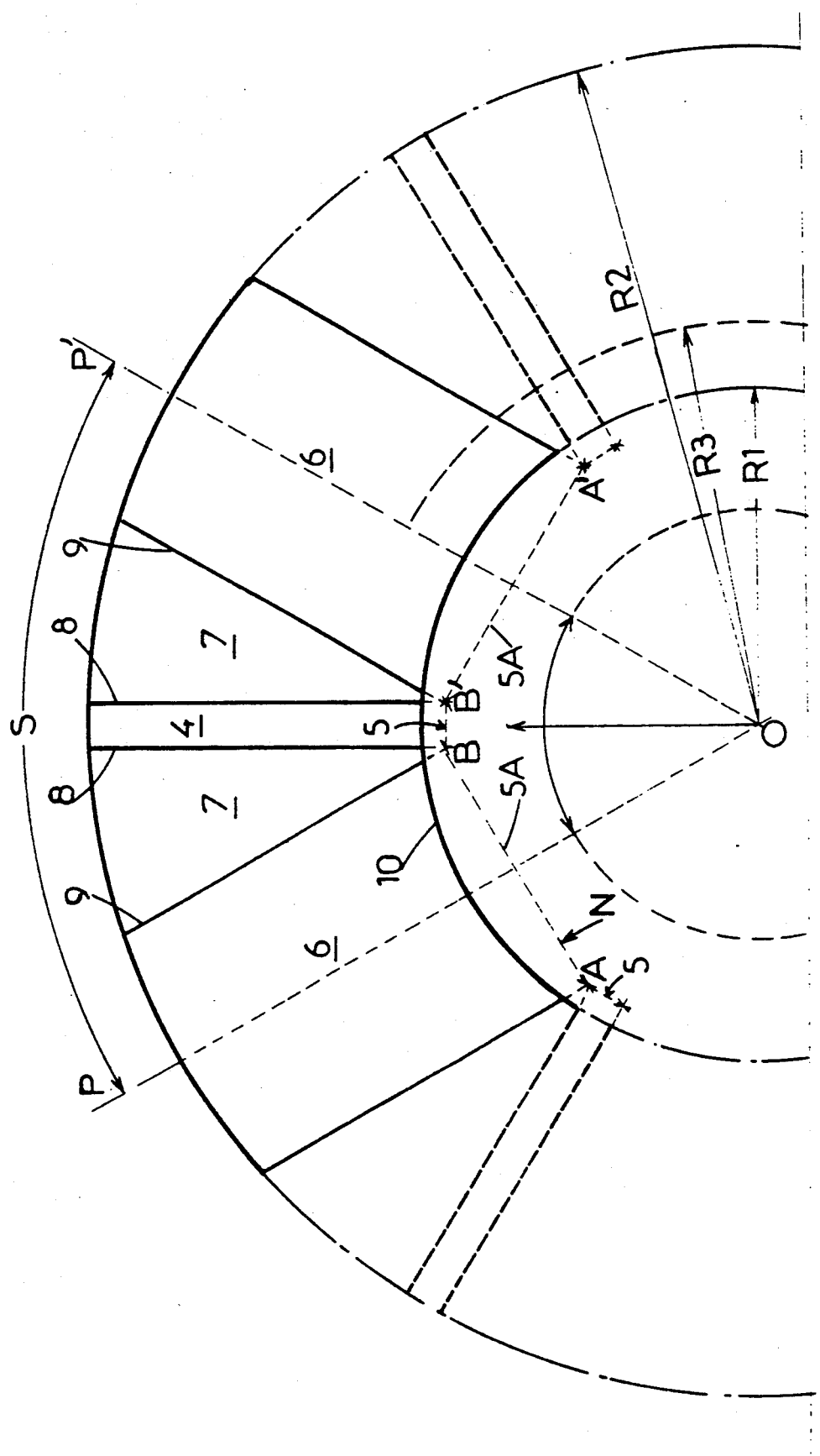
FIG.:1

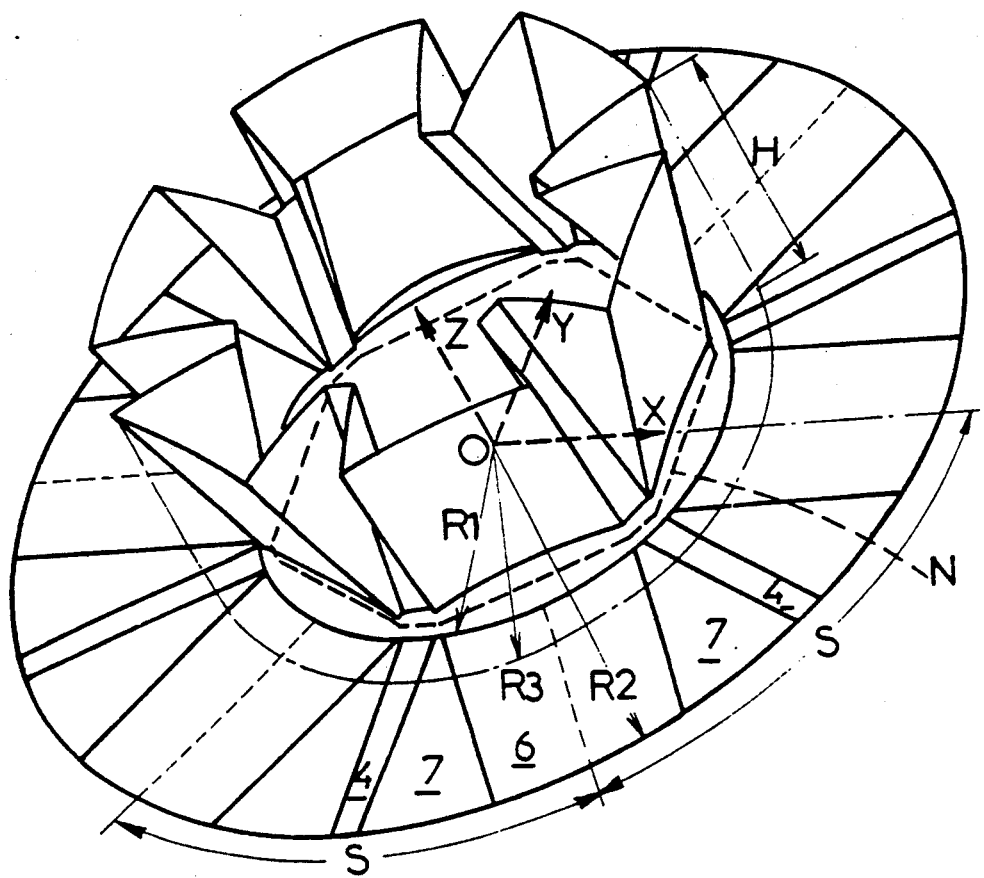
FIG.: 2

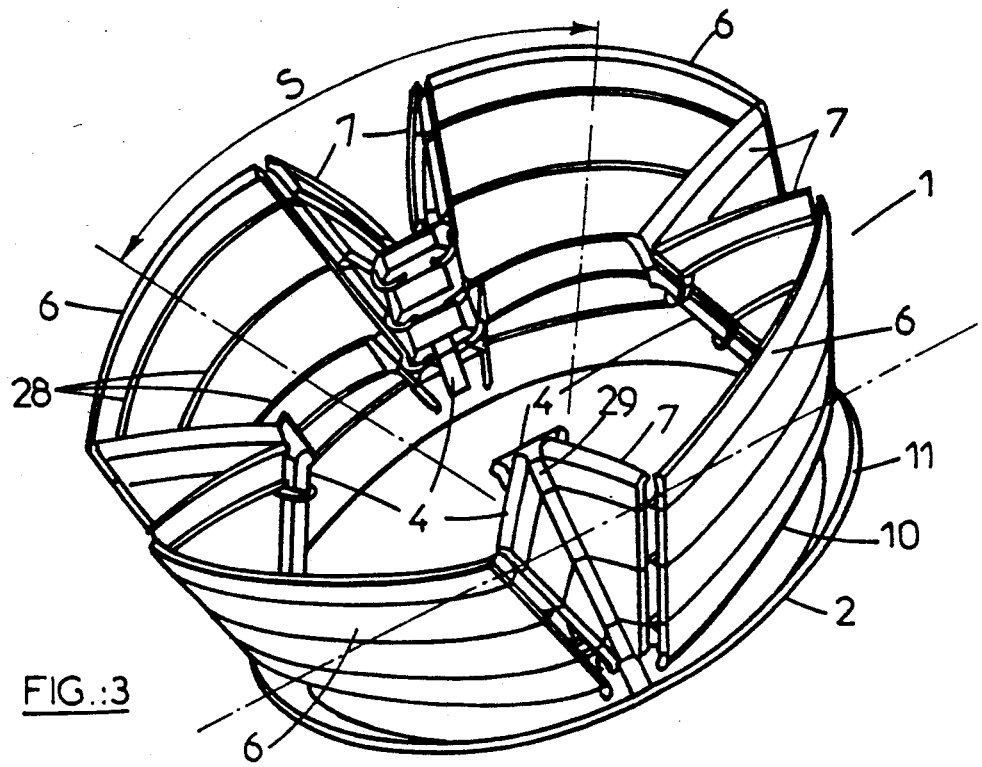
FIG.:3
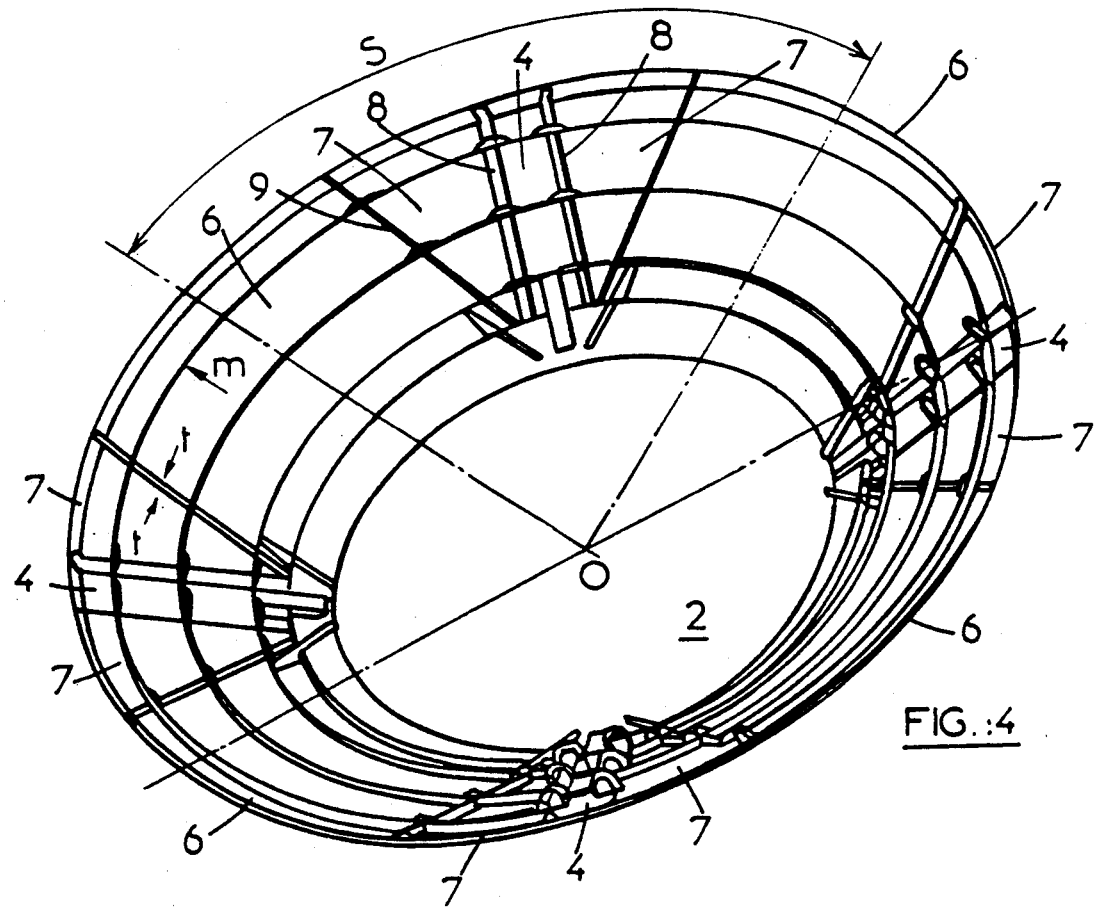
FIG.:4

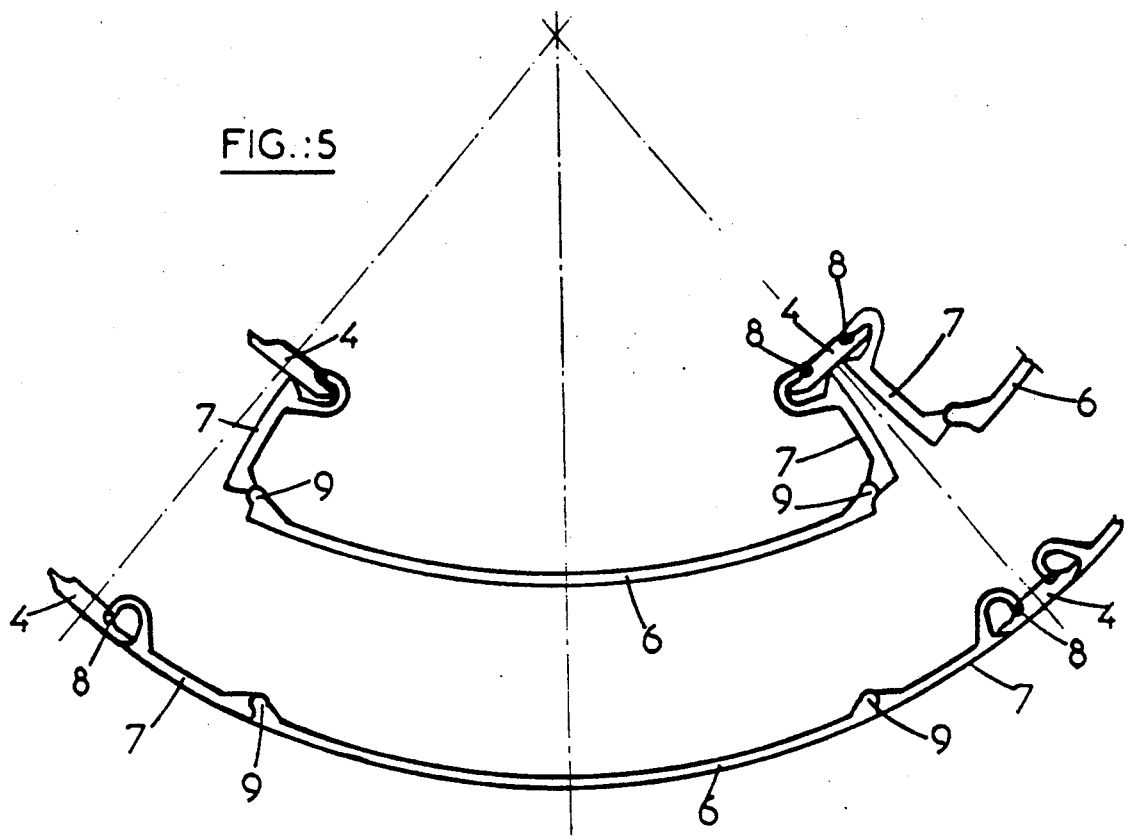
FIG.:5
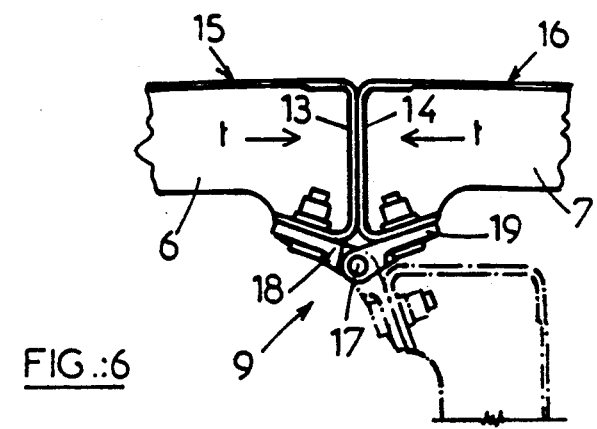
FIG.:6

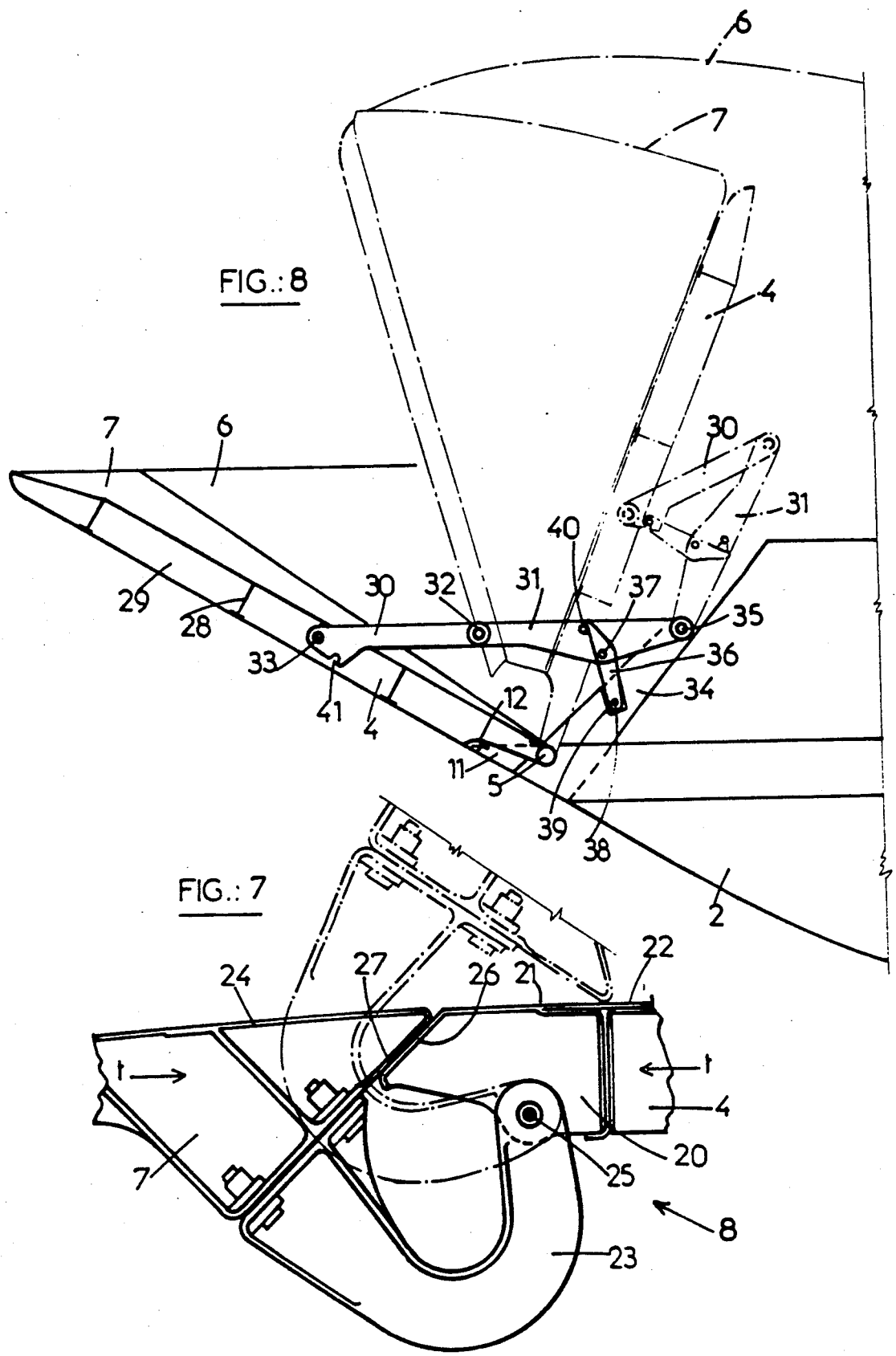

DEPLOYABLE DEVICE, IN PARTICULAR INTENDED FOR THE DECELERATION OF PLANETARY REENTRY BODIES

BACKGROUND OF THE INVENTION

The present invention relates to a deployable device comprising elements connected to a support by articulations situated in a plane and the axes of which form, within this plane, a convex polygon. This device is capable of moving from a folded-up position in which the said elements form a first angle with the said plane, to a deployed position in which the elements form a smaller angle with the said plane and together constitute a substantially continuous surface.

The object of the invention is to provide a device forming a continuous surface, of large dimensions, capable of resisting, without modification, compressive forces resulting from a flow of aerodynamic or other origin, in a deployed position, and capable of being folded-up and stored within a space of reduced diameter.

A device of this type finds its application, in particular, in the aerospace field, on planetary reentry bodies where all the measuring instruments must be stored at launch in a reduced space (for example the nose cone of the launcher rocket) and, when it penetrates into the atmosphere, offer a continuous aerodynamic surface so as not only to decelerate this reentry but also to constitute a screen to the rise in temperature to which the said instruments in contact with the atmosphere will be exposed.

The application of a device according to the invention in such a field must enable probes to be produced which have large dimensions in the deployed state but occupy a restricted space during launch.

Deployable devices of the type mentioned at the beginning are known with the same operating principle as an umbrella, moving from a folded-up closed position to a deployed open position, the opening or closing operation being performed by action on ribs articulated about an axis in order to form, at their base, a supporting polygon and between which can be tensioned pieces of an initially approximately circular fabric panel formed into a dome by the curvature of the ribs.

This type of device can be combined with those of U.S. Pat. Nos. 3,228,634 and 4,896,847.

Other types of deployable devices are also known in the packaging industry in which, for ease of storage, folding and shaping systems are employed which make it possible, for example, to obtain a cardboard container from a flat element.

However, when deployed, umbrellas do not provide a surface of stable shape when they are subjected to an intense aerodynamic flow. Known cardboard packages for their part are not known for interacting with a drive device capable of holding them in place against an aerodynamic flow.

SUMMARY OF THE INVENTION

The object of the present invention is to provide a device of the type mentioned at the beginning which preserves a stable shape under the effect of an aerodynamic flow, even when intense, and which at the same time is simple and light.

To this end, it provides a deployable device comprising a support and elements capable of pivoting about axes fixed relative to this support, these axes constituting a convex polygon within a plane, and the elements being capable of pivoting together about the said axes in order to move the device from a folded-up arrangement in which the elements form a first angle with the said plane, to a deployed arrangement in which the elements form, with the said plane, a second angle smaller than the first and together constitute an approximately continuous surface, the special feature of which is that the said elements comprise first rigid panels, each linked to the support so as to be able to pivot by a first angle about a first axis which constitutes a first side of the said polygon, and second rigid panels in a number equal to the first panels and inserted between them, each linked to the support so as to be able to pivot by a second angle, smaller than the first, about a second axis which constitutes a second side of the said polygon, and rigid linking panels are each placed between a first and a second panel and are connected to this first panel by an articulation with an axis perpendicular to the first axis, and to this second panel by an articulation with an axis perpendicular to the second axis.

The device must meet certain specifications in the deployed position in which the structure must ensure resistance to the compressive forces and the stability of the assembly of elements which constitutes it. The assembly must provide an aerodynamic surface of good geometrical quality. The functions of the various elements must have no appreciable effect on the aerodynamic qualities as a result of plays, misalignments or deformations which are not controlled.

In the folded-up position, the assembly must permit storage in a space of minimum diameter, and the assembly must be rigid so as to ensure good vibration resistance.

The links between the various elements must be able to guarantee the integrity of the system and to ensure a satisfactory operational reliability.

Various features,—explained below, make it possible to conform to these various specifications in an optimum manner.

BRIEF DESCRIPTION OF THE DRAWINGS

These features—will become apparent from the following description of theoretical arguments and practical examples, illustrated with the drawings, in which:

FIG. 1 is a partial plan view of the geometrical construction of a deployable device according to the invention, showing the definition of the constituent sectors.

FIG. 2 is a perspective view of the device in FIG. 1, showing the device both in plan view and in the folded-up position, showing the way in which the volume is defined.

FIGS. 3 and 4 illustrate, in the folded-up and deployed position respectively, another device according to the invention seen in perspective.

FIG. 5 is a diagrammatic view, in partial radial section, of a device such as that in FIGS. 3 and 4, showing the position of the panels in the folded-up and deployed position.

FIGS. 6 and 7 are detailed views showing, in section, the articulation of a linking panel with a main panel and with an arm respectively.

FIG. 8 is a sectional view of an arm and of its control linkage.

DETAILED DESCRIPTION OF A PREFERRED EMBODIMENT

The deployable device, referenced as a whole by 1 in the figures, finds its application, in particular, in the aerospace field, on planetary reentry bodies. It can be considered as formed from a plurality of sectors S articulated so as to be able to move with respect to a support 2 to which they are connected by articulations, and capable of moving from a folded-up position in which the said sectors S form, as a whole, a first angle with the plane of the support 2, to a deployed position in which the sectors S form a smaller angle with the said plane in order to constitute together a continuous external surface of revolution.

The theoretical example shown in FIGS. 1 and 2 shows a device composed of six equal sectors S, whereas the practical illustrative embodiment illustrated in FIGS. 3 to 8 concerns a device composed of four equal sectors S arranged at 90° with respect to the centre of the support 2. The number of sectors can vary depending on circumstances.

According to FIGS. 1 and 2, the aerodynamic surface of the deployed device can be likened to a plane surface in the form of a ring, lying between an inner circle of radius R1 and an outer circle of radius R2. In the folded-up state, the device is situated within a volume approximately in the shape of a truncated cone, the largest base of which has a radius R3 considerably smaller than the radius R2 of the outer circle, and the height H of which is close to the difference R2−R1.

Each sector S (apex angle 60° in this case) consists of elements connected to the support 2 by articulations situated within the plane of the latter in order to form, within this plane, a polygon N of centre O. In the example of FIGS. 1 and 2, the polygon N is a regular dodecagon formed alternately from small sides and large sides respectively of identical lengths. In the case of the device in FIGS. 3 to 8, the polygon is, of course, an octagon.

The elements of each sector S consist of a first, central rigid panel or arm 4, of substantially rectangular shape, connected to the support 2 by an articulation 5, the fixed axis BB′ of which constitutes one of the above-mentioned small sides of the twelve-sided polygon N. Second panels 6, likewise substantially rectangular, are inserted in an equal number between the said first panels 4 of each sector S and are connected to the support by articulations 5A, the fixed axes AB, A′B′ of which constitute two of the large sides of the twelve-sided polygon N, which large sides are adjacent to the small side BB′.

The second panels 6, termed main panels since they have larger dimensions, are connected to each adjacent arm 4 via a linking panel 7 of triangular shape, in which the vertex of the most acute angle coincides with the end B or B′ of the axis BB′ situated on the dodecagon. Each linking panel 7 is articulated, on the one hand, to an arm 4 by a movable axis of articulation 8 perpendicular to the fixed axis of articulation BB′ connecting the said first panel 4 to the support 2, and it carries another movable articulation 9 perpendicular to the fixed axis AB or A′B′ about which each main panel 6 pivots.

It should be noted that each of the elements 4, 6, 7 constituted in this manner is itself undeformable, and that their connection with respect to one another makes it possible to obtain a structure forming a closed ring which is resistant both to the tangential forces "t" and to the meridional or radial forces "m".

It should be noted that the axes of the articulations 8 and 9 coincide at the point B or B′ of intersection of the axes BB′ and AB or A′B′; that the axes AB and A′B′ are respectively normal to the planes P and P′ which limit the sector S; and lastly that the axes AB, BB′ and B′A′ are coplanar.

It should also be noted that the radius of curvature of the lower base 10 of the main panels 6 or of the arms 4 is such that it can be adapted to the circular profile of a flange 11 projecting from the support 2 (FIGS. 3 and 8), when the said panels 6 are deployed. In order to perfect this contact and provide a surface of good aerodynamic quality, a groove 12 in the panel 6 can fit over a rounded edge of the said flange 11 of the support 2 (FIG. 8).

In accordance with a kinematic illustrated in FIG. 2, the rotation of the arm 4 about the fixed axis BB′ moves the linking panels 7 via the movable articulations 8.

Furthermore, the linking panels 7, also articulated to the elements 6 by the movable axes 9, move the latter in rotation about the fixed axes AB and A′B′.

FIG. 2 shows that the total pivoting of an arm is of the order of 120°, whereas that of a main panel is only 80°.

The combined rotations of the articulations 8 about BB′, and of the articulations 9 about AB and A′B′ respectively drive the linking panels 7 in a wheeling motion about the points B or B′.

The folding-up performed in this way makes it possible to store the sector S within a cylindrical basic volume of maximum radius R3 (or possibly R1).

For reasons of simplicity, FIGS. 1 and 2 show a system formed from plane panels and from a circular support, the device being plane in the deployed position. In practice, inwardly curved panels are preferred, as shown in FIGS. 3 to 5. These figures also show a device which, in the deployed position, has a frustoconical, and not a plane shape. The support, for its part, does not necessarily have to have a circular shape.

The figures show, furthermore, that the arms have smaller dimensions than the main panels. This is not essential for operation. In practice, the choice follows from two types of consideration which will be explained.

The general equilibrium of a body of revolution subjected to a uniform pressure is translated by tangential (or circumferential) forces "t" and meridional (or radial) forces "m". In the case of a truncated cone secured on its small base and subjected to an external pressure parallel to the axis and directed from the small base towards the large base (see FIG. 4), the structure will be compressed by tangential forces "t" and tensioned by the meridional forces "m".

In order to obtain a "looping" of the compressive forces without exaggerated loads on the pivots of the articulations 8, 9, it is preferable for bearing surfaces provided on the mutually facing edges of the adjacent panels 4, 6, 7, to be arranged so as to transmit from one panel to another at least part of the compressive forces resulting from an approximately uniform dynamic pressure.

It is of advantage for the system to be self-stabilising, in other words that the forces resulting from the pressure tend to cause on the assembly displacements of the various elements in an inverse direction to the displacements which correspond to the folding-up. This result is obtained mainly by providing for the main panels to be larger than the arms, with the result that they are subjected to a thrust which would tend to cause them to move into a position behind the plane of the arms, in other words closer to the axis OZ, whereas the permitted folding-up movement obliges them to be constantly in advance of this same plane (see FIG. 5).

Moreover, after studying systems in which the first and second panels were of the same dimensions, it was established that the space requirement in the folded-up position could be reduced, for a same free volume within the device, by providing that the first panels, or arms, have dimensions which are considerably smaller than the second panels or main panels. In very special cases, of course, the form of the on-board equipment can necessitate departure from this rule.

Thus, the considerations of stability and space requirement result in general in the same conclusion.

The active controlling of a single arm 4 in rotation is sufficient to deploy the complete system by the mutual driving of the elements. Consequently, a combined active controlling of the elements 4 makes it possible to make the system reliable. It is possible to control the deployment, the folding-up, or both.

As for the static equilibrium of the complete folded-up device, it is obtained as follows:

The arms 4 have three articulated sides plus one free side,

The main panels 6 have three articulated sides plus one free side,

The linking panels 7 have two articulated sides plus one free side.

The locking in rotation of the arms (and even of just one arm) about the fixed axes BB' is therefore sufficient to stabilise the complete system in a given position.

It would be possible, at least in theory, to dispense with the articulation connecting a main panel directly to the support. In practice, this articulation is obligatory for reasons of reliability and of equilibrium of the applied forces.

FIG. 6 shows the structure of an articulation 9 between a main panel 6 and a linking panel 7. The opposite edges of the panels 6 and 7 each comprise a bearing surface 13, 14 perpendicular to the outer surface 15, 16 of the corresponding panel, which is subjected to the aerodynamic pressure. In the deployed position shown in solid lines, the bearing surfaces 13, 14 are in contact with each other. The reference 17 designates the pivot of the hinge 8, carried by brackets 18, 19 mounted on the panels 6 and 7. The axis of the pivot 17 is within the plane of the bearing surfaces 13, 14, and this pivot is at a distance from the outer surface 15, 16. It can be appreciated that the compressive forces "t" are transmitted directly from one panel to another, tending to maintain the hinge in the deployed position. The outer surface of the assembly is smooth, the pivot 17 being subjected to virtually no stress.

FIG. 7 shows the structure of an articulation 8 between an arm 4 and a linking panel 7. The arm 4 carries a bracket 20, the outer surface 21 of which extends the outer surface 22 of the arm 4. The linking panel 7 carries a swan-neck bracket 23, situated entirely on the inside with respect to the outer surface 24 of the panel 7. The two brackets 20, 23 are connected by an articulation pivot 25. The bracket 20 and the end of the panel 7 each have a bearing surface 26, 27 at approximately 45° to the outer surfaces 21, 24, and these bearing surfaces are in contact with each other when the assembly is in the deployed position, in solid lines in the figure. The pivot 25 is situated on a perpendicular to the bearing surfaces, passing approximately through their intersection with the corresponding outer surface 21, 24.

FIG. 8 shows, on a smaller scale, an articulation 5 connecting the arm 4 to the support 2. This articulation, of the conventional type, does not require comment apart from pointing out that it is associated with a flange 11 of the support. This flange, in the deployed position, is in contact with a groove 12 of the arm in order to constitute an outer surface without any discontinuity which could adversely affect the aerodynamic qualities. The section in FIG. 8 applies also to the articulations 5A linking the main panels 6. These articulations comprise two pivots, each situated in proximity to one corner of the panel and which, in fact, are carried by the same bracket of the support as the articulation 5.

The internal-rotation articulations 5, 5A and 8 take the form of hinges or bearings permitting a limited deflection both for opening and for closing, whereas the external-rotation articulations 9 (FIG. 5), which constitute a re-entrant angle, take the form of so-called "swan-neck" bearings permitting large angular deflections. The capacity of rotation of these articulations is a determining parameter for defining the system. (A rotation of 75° can be considered as a basic value).

The articulations are in mechanical abutment at the end of their travel in the deployed position, and this makes it possible to ensure the geometrical quality of the assembly, its equilibrium and its stability.

The structure of the connection of the articulation 9 to its surfaces 13, 14 means that, when the deployed assembly is subjected to a dynamic pressure, the linking panels behave as if they were integral with the main panels. The stability is acquired in that the area of the outer surface of an arm is less than half the sum of the areas of the outer surfaces of the linking panel and of the adjacent main panels, since the force directed towards the axis which is exerted on the assembly formed by the linking panels and the main panels is greater than that which is exerted on the arm, and counters the movement permitted by the articulations for the folding-up.

In the practical example described, it is, however, preferred for reasons of safety, to provide a locking in the deployed position and also in the folded-up position in order to oppose vibratory phenomena, for example at the moment of the launch of a rocket.

FIG. 8 shows how this locking is obtained. An arm 4 is articulated at 5 on the support 2. Two bars 30, 31 are connected together by an articulation 32, and one of the bars 30 is connected to the arm 4 by an articulation 33, whereas the other bar 31 is connected to a bracket 34, integral with the support 2, by an articulation 35. The articulations 32, 33 and 35 are parallel to the articulation 5. In the deployed position, shown in solid lines in FIG. 8, the articulations 32, 33 and 35 are aligned, which effects the immobilisation and permits the transmission of the forces between the support 2 and the set of panels.

A locking rod 36 is connected to the linkage 31 by an articulation 37 parallel to the articulation 35. It carries, at one end, a locking finger 38, pushed by a spring (not shown), and which, in the deployed position, penetrates into a notch 39 of the bracket 34. The other end of the rod 36 is retained by a stop 40 carried by the bar 31, which prevents the finger 38 from coming out of the notch of the bracket 34, and ensures the locking in the deployed position. In the folded-up position, in dot-dash lines in FIG. 6, the finger 38 penetrates into a notch 41 of the bar 30, which ensures the locking in this position.

Cable links, not shown, ensure the displacements of the bars 30, 31.

In the case of assemblies driven in a rotating motion about the generating axis, the inertia forces have a natural tendency to cause the deployment. In this particular case, it is possible not to use an actuating means for the displacement, but a locking system is then necessary in general.

A circumferential stiffening by ribs 28 makes it possible to loop back the tangential forces, and it must take into account the effects of instability upon buckling, as a result of the compressive forces.

A radial rib 29 associated with the articulation bearings 5 (or 5A) makes it possible to collect and balance the tangential forces.

The articulation pieces are placed at the intersection of circumferential and radial ribs.

The outer surface of the panels can be constituted by a thin structure such as metal sheeting or taut fabric, and the latter must meet the safe buckling or post-buckling conditions under compression (tangential direction) enabling the structure to preserve its integrity without having any significant detrimental effect on the geometrical qualities of the aerodynamic surface.

Since the maximum dimensions of such systems are often linked to the dimensional feasibility of the constituent elements, it is possible to expand the field of application.

These various features of the invention permit relative movements of the linked elements, limited to simple rotations about linear axes. Swivelling movements and linear or complex displacements are avoided.

Lastly, it should be noted that the principle of the invention can be used in the case where the dynamic pressure is applied in the opposite direction, in other words to the concave face of the set of panels. The compressive stresses then become tensile stresses, and vice versa. It is therefore the articulations 5, 5A connecting the panels to the support which will have to be capable of transmitting compressive forces.

I claim:

1. Deployable device comprising:
    a support;
    first rigid panels, each linked to the support so as to be able to pivot by a first angle about a first fixed axis with respect to the support and which constitutes a first side of a plane convex polygon linked to the support;
    second rigid panels, in a number equal to the first panels and inserted between them, each mounted so as to be able to pivot by a second angle, smaller than the first, about a second axis linked to the support and which constitutes a second side of the said polygon; and
    rigid linking panels, each placed between a first and a second panel and connected to the said first panel by a first articulation with an axis perpendicular to the said first axis, and to the said second panel by a second articulation with an axis perpendicular to the said second axis, and
    a common actuating system capable of pivoting the said panels together about the said axes, and said first and second articulations for moving the device from a folded-up arrangement in which the elements form a first angle with the plane of the said polygon, to a deployed arrangement in which the elements form, with the said plane, a second angle smaller than the first and together constitute an approximately continuous surface.

2. The device of claim 1, in which bearing surfaces provided on the mutually facing edges of the adjacent panels are arranged so as to transmit from one panel to another at least part of compressive forces resulting from an approximately uniform dynamic pressure.

3. The device of claim 2, in which the bearing surfaces between second panels and linking panels are perpendicular to their outer surface, and the area of a first panel is less than half the sum of the areas of the two linking panels and of the two adjacent main panels.

4. The device of claim 1, in which arms, have dimensions which are considerably smaller than the main panels.

5. The device of claim 1, in which the said actuating system intended to displace the panels between the folded-up position and the deployed position comprises means for locking said panels in deployed position.

6. The device of claim 1, in which the actuating system also comprises means for locking the panels in the folded-up position.

7. The device of claim 1, in which the articulations between panels which constitute a re-entrant angle in the folded-up position are connected to one of the panels by a part in the shape of a swan-neck.

8. The device of claim 1, in which each panel has a thin structure reinforced by ribs, the articulation pieces being placed at the intersection of some of these ribs.

9. The device of claim 1, in which the support has a rigid surface which extends without any discontinuity and the surface constituted by the panels when the panel are deployed forms an extension to said rigid surface.

10. The device of claim 1, and configured for aerodynamic deceleration and thermal protection of a recoverable piece of equipment in satellite orbit upon its entry into the atmosphere.

* * * * *